United States Patent [19]
Ohmi

[11] Patent Number: 6,041,030
[45] Date of Patent: Mar. 21, 2000

[54] OPTICAL DISK RECORDING/REPRODUCING DEVICE WITH ECCENTRIC AND INCLINE CHUCK CONTROL

[75] Inventor: Takao Ohmi, Kamakura, Japan

[73] Assignee: Kabushiki Kaisha Toshiba, Kawasaki, Japan

[21] Appl. No.: 08/932,123

[22] Filed: Sep. 17, 1997

[30] Foreign Application Priority Data

Sep. 18, 1996 [JP] Japan ................................. 8-246429

[51] Int. Cl.$^7$ ......................................... G11B 7/00
[52] U.S. Cl. ........................... 369/54; 369/50; 369/44.32
[58] Field of Search ........................... 369/50, 54, 44.32, 369/75.2, 76, 270, 271, 233, 236, 231, 258, 265; 360/98.08, 99.05, 99.12

[56] References Cited

U.S. PATENT DOCUMENTS 5,140,575 8/1992 Fushiki ................................. 369/44.32

FOREIGN PATENT DOCUMENTS

| 362270057 | 11/1987 | Japan . |
| 4-19827 | 1/1992 | Japan . |
| 405109171 | 4/1993 | Japan . |
| 63-108559 | 5/1998 | Japan . |

Primary Examiner—Thang V. Tran
Attorney, Agent, or Firm—Pillsbury Madison & Sutro LLP

[57] ABSTRACT

An optical disk recording/reproducing device which records or reproduces recording information on or from an optical disk by use of optical head while the optical disk is chucked on a disk rotating mechanism and rotated and comprises a tilt detector for detecting a tilt angle of the optical disk which is being rotated, and a controller for determining whether the tilt angle detected by the detecting means is set within a permissible range or not, wherein the controller retries the chucking operation when the determining means determines that the tilt angle exceeds the permissible range.

19 Claims, 13 Drawing Sheets

| NUMBER OF ADJUSTMENTS | NORMALIZED TILT ANGLE (T) | | |
|---|---|---|---|
| | TRIAL 1 | TRIAL 2 | TRIAL 3 |
| 0 | 3.0 | 2.4 | 3.0 |
| 1 | 3.4 | 2.5 | 2.5 |
| 2 | 2.8 | 2.1 | 2.8 |
| 3 | 2.5 | 2.2 | 2.4 |
| 4 | 2.9 | 2.0 | 3.0 |

OPTICAL DISK RECORDING/ REPRODUCING DEVICE WITH ECCENTRIC AND INCLINE CHUCK CONTROL

BACKGROUND OF THE INVENTION

This invention relates to an optical disk recording/ reproducing device for recording/reproducing information with respect to an optical disk, and more particularly to an optical disk recording/reproducing device capable of effectively preventing the occurrence of recording/reproducing errors caused by the inclination or eccentricity of an optical disk.

With the evolution of a high-level information-oriented society, optical disk recording/reproducing devices capable of recording information on optical disks as information recording mediums with high precision and high density and/or reproducing the information recorded in the above-described manner, have been developed. Optical disks used in conjunction with the above device are compact disk (CDs), laser disk (LDs), and digital video disks or digital versatile disks (DVDs). Of these disks, DVDs can be formed with super-large capacities and have received much attention.

Unlike a fixed type magnetic disk device (i.e., hard disk device), in the optical disk recording/reproducing device, recording media, that is, optical disks can be replaced. The optical disk recording/reproducing device has a disk rotating mechanism constructed by, for example, a spindle motor for rotating the optical disk and uses a clamp mechanism to chuck the optical disk inserted into the optical disk recording/reproducing device on a turn table of the spindle motor.

In the above optical disk recording device, the precision with which the optical disk is chucked on the disk rotating mechanism, significantly influences the operation of the information recording/reproducing. That is, in a worst case scenario, if the optical disk is chucked in an inclined state or the optical disk is eccentrically chucked on the disk rotating mechanism, it becomes impossible to perform the information recording or reproducing operation.

If the optical disk is chucked in an inclined state, an error of the axis of the optical system becomes large. This error referred to as a tilt angle or as "tilt" indicates the angle made by a vertical axis perpendicular to the recording surface of the optical disk with respect to the optical axis of the optical pickup. When the tilt exceeds a permissible range, it becomes practically impossible to effect the information recording/reproducing operation.

Further, if the optical disk is eccentrically chucked, the spot of the light beam deviates from the track of the optical disk. This deviation is called a track error, and when it exceeds a permissible range as in the case of the tilt angle, it becomes practically impossible to effect the information recording/reproducing operation.

In optical disks recently developed or optical disks of large capacity (such as DVDs), since the information recording density is extremely high, it becomes necessary to, strictly manage the tilt angle or track error in comparison with the conventional case, in order to effect the precise recording/reproducing operation.

Therefore, in the optical disk device for effecting the recording/reproducing operation with high density, a mechanism for correcting the inclination of the optical disk by use of a servo motor or a mechanism for controlling the angle of the optical axis of the optical pickup to follow the tilt angle is provided.

However, provision of the servo mechanism makes the device structure complex and increases the cost of the device. Further, if the permissible error caused at the time of manufacturing of the optical disk and the disk rotating mechanism is set to an extremely restrictive range, the manufacturing cost increases.

BRIEF SUMMARY OF THE INVENTION

An object of this invention is to provide an optical disk recording/reproducing device capable of effectively suppressing the inclination (tilt angle) or eccentricity (track error) occurring at the time of chucking of the optical disk.

In order to attain the above object, according to a first aspect of this invention, there is provided an optical disk recording/reproducing device which records or reproduces recording information on or from an optical disk by use of an optical head while the optical disk is chucked on a disk rotating mechanism and rotated. The device comprises detecting means for detecting a tilt angle of the optical disk which is being rotated; determining means for determining whether the tilt angle detected by the detecting means is set within a permissible range or not; and control means for retrying the chucking operation on the optical disk when the determining means determines that the tilt angle exceeds the permissible range.

In the first aspect, attention is given to the fact that the optical disk may be chucked in an inclined state and the tilt angle may exceed the permissible range depending on the inclination of the disk when the optical disk is inserted into the optical disk recording/reproducing device and chucked on the disk rotating mechanism constructed by a spindle motor, for example.

Therefore, if the tilt angle exceeds the permissible range, the chucking operation is retried. Thus, the coupling state of the optical disk with the disk rotating mechanism is improved and the probability that the inclination of the disk is reduced increases thereby making it possible to suppress the tilt within the permissible range.

It is preferable to retry the chucking operation by first releasing the optical disk from the disk rotating mechanism and then chucking the optical disk again. In this case, the re-chucking operation may be repeatedly effected within a preset specified number of times until the tilt angle is set into the permissible range.

Further, it is preferable to retry the chucking operation by first interrupting the rotating operation of the disk rotating mechanism for rotating the optical disk and then change of the rotating speed(for example by accelerating/decelerating the rotating operation) of the disk rotating mechanism so as to adjust the chucking position of the optical disk. In this case, the accelerating/decelerating operation may be repeatedly performed within a preset specified number of times until the tilt angle is set within the permissible range.

According to a second aspect of this invention, there is provided a method of controlling an optical disk recording/ reproducing device which records or reproduces recording information on or from an optical disk by use of optical head while the optical disk is chucked on a disk rotating mechanism and rotated. The method comprises the steps of detecting a tilt angle of the optical disk which is being rotated; determining whether the tilt angle detected in the detecting step is set within a permissible range or not; retrying the chucking operation on the optical disk when it is determined that the tilt angle exceeds the permissible range; and repeatedly, performing the re-chucking operation until the tilt angle of the optical disk is set into the permissible range.

The operation in the second aspect corresponds to the operation of the first aspect.

According to a third aspect of this invention, there is provided an optical disk recording/reproducing device which records or reproduces recording information on or from an optical disk by use of optical head while the optical disk is chucked on a disk rotating mechanism and rotated. The device comprises detecting means for detecting a track error value of the optical disk which is being rotated; determining means for determining whether the track error value detected by the detecting means is set within a permissible range or not; and control means for retrying the chucking operation on the optical disk when the determining means determines that the track error value exceeds the permissible range.

In the third aspect, attention is given to the possibility that the optical disk may be eccentrically chucked and the track error value (corresponding to an amount of eccentricity) may exceed the permissible range depending on the inclination of the disk when the optical disk is inserted into the optical disk recording/reproducing device and chucked on the disk rotating mechanism constructed by a spindle motor, for example.

Therefore, if the track error value exceeds the permissible range, the chucking operation of the optical disk is retried. Thus, the coupling state of the optical disk with the disk rotating mechanism is improved and the probability that the amount of eccentricity of the disk is reduced increases, thereby making it possible to suppress the track error value within the permissible range.

It is preferable to retry the chucking operation by first releasing the optical disk from the disk rotating mechanism and then chucking the optical disk again (re-chucking). In this case, the re-chucking operation may be repeatedly performed within a preset specified number of times until the track error value is set into the permissible range.

Further, it is preferable to retry the chucking operation by first interrupting the rotating operation of the disk rotating mechanism for rotating the optical disk and then changing the rotation speed of the disk rotating mechanism so as to adjust the chucking position of the optical disk. In this case, the accelerating/decelerating operation may be repeatedly effected within a preset specified number of times until the track error value is set into the permissible range.

According to a fourth aspect of this invention, there is provided an error compensation method used for an optical disk recording/reproducing device which records or reproduces recording information on or from an optical disk by use of optical head while the optical disk is chucked on a disk rotating mechanism and rotated. This method comprises the steps of detecting a track error value of the optical disk which is being rotated; determining whether the track error value detected in the detecting step is set within a permissible range or not; retrying the chucking operation on the optical disk when it is determined that the track error value exceeds the permissible range; and repeatedly effecting the re-chucking operation until the track error value of the optical disk is set into the permissible range.

The operation in the fourth aspect corresponds to the operation of the third aspect.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

DETAILED DESCRIPTION OF THE INVENTION

There will now be described first to tenth embodiments of this invention with reference to the accompanying drawings.

System Configuration

First, the construction of a device which is common in the first ten embodiments of this invention is explained with reference to the block diagram of FIG. 1.

Figure 1:
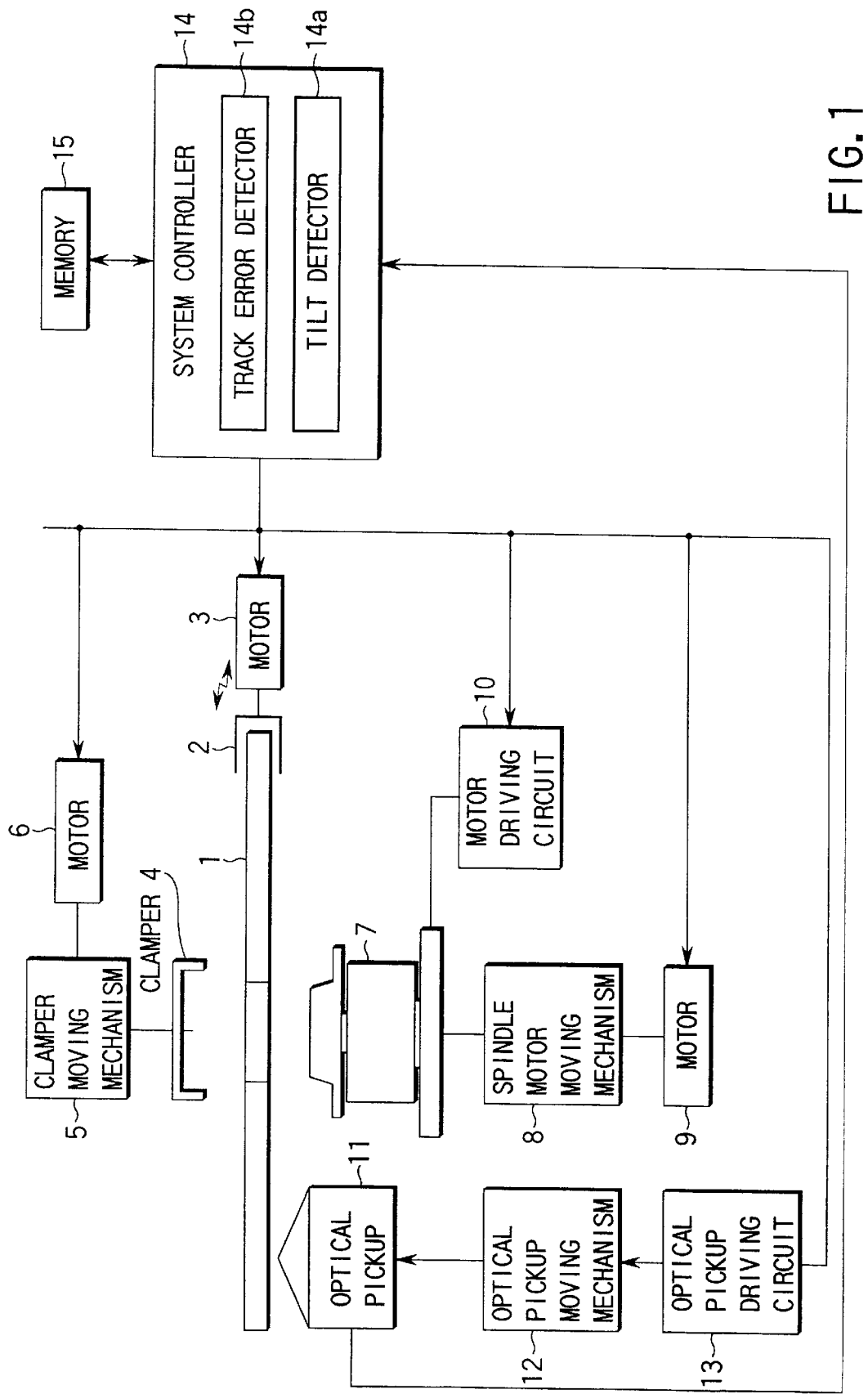
FIG. 1 is a block diagram showing the main portion of an optical disk recording device according to this invention.

In FIG. 1, a reference numeral 1 denotes an optical disk used as an information recording medium. An optical disk recording device of this embodiment includes an optical disk exchange mechanism for exchanging an optical disk 1. The mechanism includes a disk tray 2 for holding the optical disk 1, and a driving motor 3 for driving the disk tray 2 in a horizontal direction.

The optical disk exchange mechanism is placed between a clamper 4 and a spindle motor 7 disposed in opposition to each other in a vertical direction to drive the optical disk 1 in the horizontal direction. The clamper 4 and spindle motor 7 are driven in the vertical direction by moving mechanisms 5, 8 and motors 6, 9 thereof so as to chuck the central portion of the optical disk 1 on the upper and lower sides thereof. The spindle motor 7 is connected to a motor driving circuit 10 and rotates the chucked optical disk 1 at a preset rotation speed.

The device further includes an optical pickup 11 for recording/reproducing information on or from the optical disk 1, an optical pickup moving mechanism 12 for driving the optical pickup 11, and an optical pickup driving circuit 13 for controlling the optical pickup moving mechanism 12.

In FIG. 1, reference numerals 14, 15 denote a system controller and a memory used as a main control unit of this device. The system controller 14 has a microprocessor (CPU) as a main constituent and controls the motors 3, 6, 9 and the motor driving circuit 10 in addition to the optical pickup driving circuit 13.

As will be described later, the system controller 14 includes a tilt detector 14a for detecting a tilt angle based on an output of the optical pickup 11 and a track error detector 14b for detecting a disk eccentric amount (track error value). The tilt detector 14a and track error detector 14b derive the tilt angle and track error value by using a measurement of reflected laser light emitted from the optical pickup 11 and reflected from the optical disk 1. Specifically, four-divided photodiodes of an optical system, provided in the optical pickup 11, are used and the tilt angle and track deviation amount in the radial direction and tangential direction are derived based on a variation in the output signals thereof, preset distance and angle information.

Further, the memory 15 is used to store the tilt angle (T) and track error value (E) detected by the system controller 14 and store various types of control information necessary for the tilt adjustment operation and track error adjustment operation as will be described later.

First Embodiment

Next, the first embodiment of this invention is explained with reference to FIGS. 2 and 3.

Figure 2:
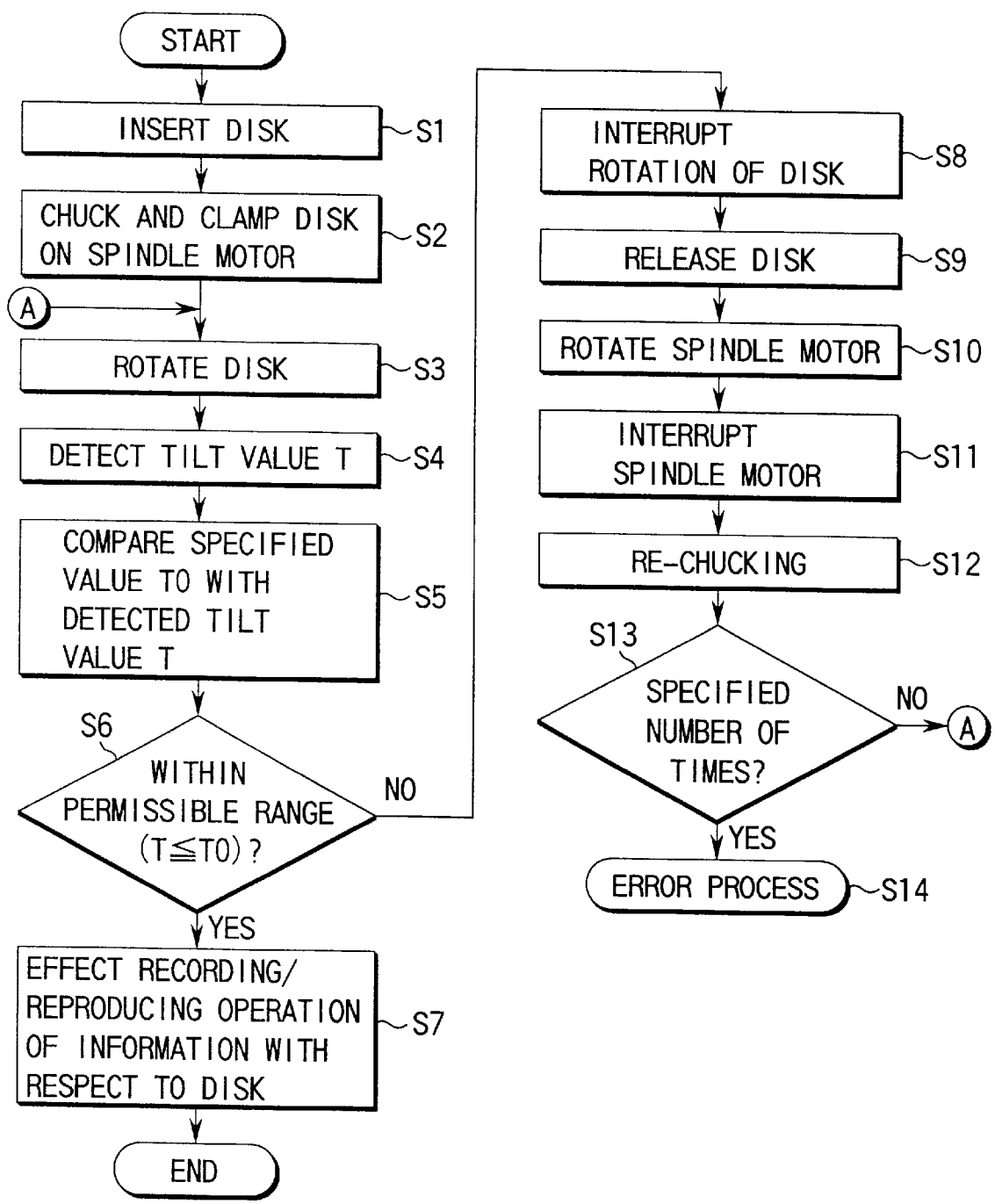
FIG. 2 is a flowchart for illustrating the operation of a first embodiment.

As shown in the flowchart of FIG. 2, the first embodiment relates to the tilt adjusting system for effecting the re-chucking operation of the optical disk 1 when the tilt value T detected by the tilt detector 14a exceeds a permissible range.

As shown in the step S1 in FIG. 2, if the user puts the optical disk 1 on the disk tray 2 and operates the insertion/ejection switch, for example, the motor 3 is driven and the optical disk 1 is received into the device (the state shown in FIG. 1). Then, the system controller 14 controls the operation of the motors 6, 9 to lower the clamper 4 by use of the clamper moving mechanism 5 and raise the spindle motor 7 by use of the spindle motor moving mechanism 8.

As a result, the optical disk 1 is clamped by the clamper 4 and chucked on the turn table of the spindle motor 7 (step S2). Then, the system controller 14 controls the motor driving circuit 10 and drives the spindle motor 7 so as to rotate the optical disk 1 (step 3).

At this time, a magnetic path is formed between a magnet, mounted on the central portion of the spindle motor 7, and the clamper 4, whose contact surface is formed of magnetic material. The optical disk 1 is stably held on the turn table of the spindle motor 7 by the magnetic force so as to be stably rotated without being separated from the spindle motor 7.

The tilt detector 14a of the system controller 14 derives a tilt angle (indicating the tilt value T) of the optical disk 1 based on a detection signal from the optical pickup 11 (step S4). Further, the system controller 14 compares the detected tilt value T with a specified value (permissible value) T0 previously stored in the memory 15 (step S5).

If the result of comparison indicates that the tilt value lies within the permissible range (T≦T0), the system controller 14 performs the normal operation of recording or reproducing information with respect to the optical disk 1 ("YES" in the step S6, S7). That is, the system controller 14 controls the optical pickup moving mechanism 12 and optical pickup driving circuit 13 to move the optical pickup 11 to a target position and records or reproduces information on or from the access target position of the optical disk 1.

On the other hand, if the detected tilt value T exceeds the permissible range (T>T0), the system controller 14 effects the tilt adjusting process as described below. That is, the system controller 14 first controls the spindle motor 7 to interrupt rotation of the optical disk 1 (step S8). Then, it raises the clamper 4 by use of the clamper moving mechanism 5 and lowers the spindle motor 7 by use of the spindle motor moving mechanism 8 to un-chuck (release) the optical disk 1 (step S9).

After the spindle motor 7 is rotated for a preset period of time or by a preset angle and then stopped, the optical disk 1 is chucked again (re-chucked) (steps S10 to S12). That is, the system controller 14 drives and controls the motors 6, 9 to lower the clamper 4 by use of the clamper moving mechanism 5 and raise the spindle motor 7 by use of the spindle motor moving mechanism 8.

In the re-chucked state, the spindle motor 7 is driven to rotate the optical disk 1 (step S3). Then, the tilt detection step and determination step described before are effected again. In this case, if the detected tilt value T lies outside the permissible range, the un-chucking/chucking operation is effected again (step S13).

If the detected tilt value T still lies outside the permissible range even after the above operation is repeatedly effected by a specified number of times, the system controller 14 determines that the tilt angle cannot be compensated for and effects a preset error process (step S14). The error process may be, for example, a process that notifies a host system or a user that an error has occurred in the inserted optical disk 1. Further, it is possible to release the optical disk 1 from the disk rotating mechanism and automatically eject the same while it is placed on the disk tray.

With the above construction, even when an excessively large tilt angle occurs, the tilt angle can be corrected and set into a preset permissible range by performing the un-chucking/chucking operation.

That is, the occurrence of the tilt angle is caused when the optical disk 1 is chucked in an inclined state.

In this embodiment, occurrence of the tilt angle is detected by use of the optical pickup immediately after chucking and the tilt angle can be adjusted (corrected) by changing the chucking position of the optical disk by effecting the un-chucking/chucking operation again.

Figures 3A, 3B:
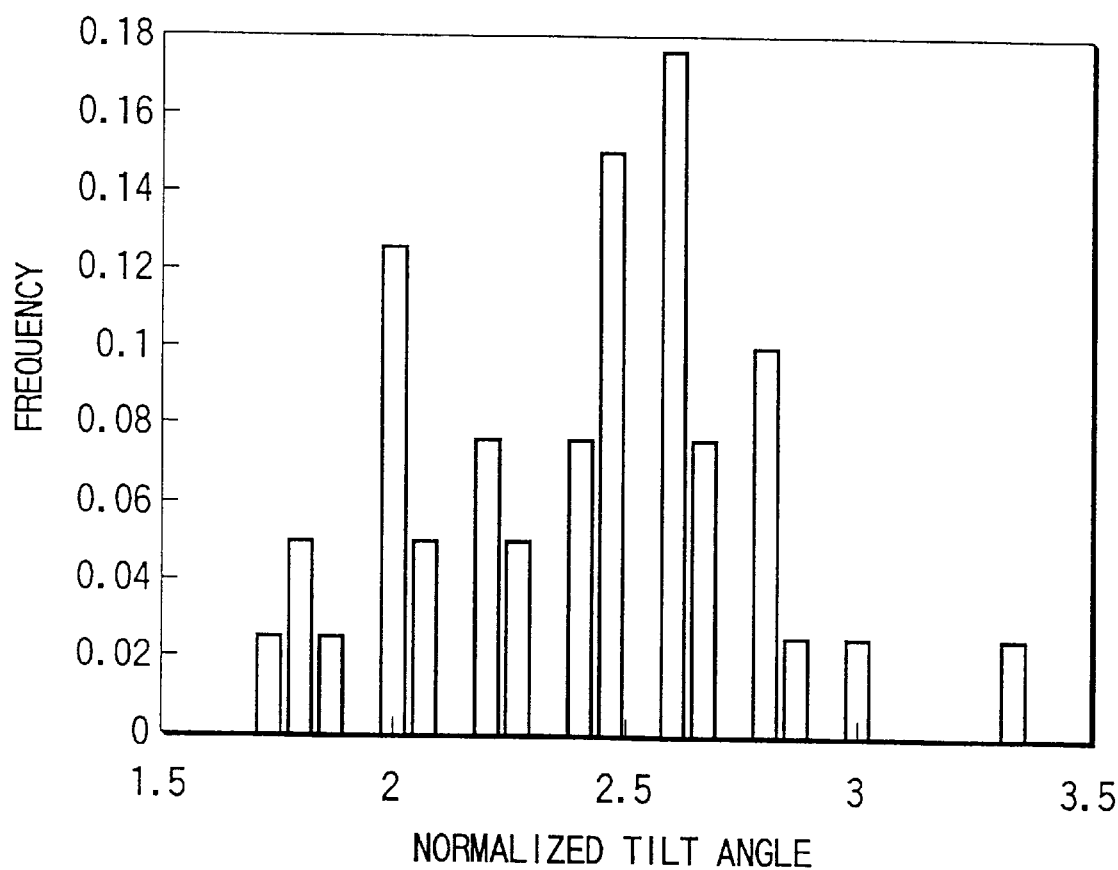
FIGS. 3A and 3B are diagrams showing experimental data for illustrating the effect of the first embodiment.

FIGS. 3A and 3B show experimental data obtained by measuring the relation between the number of chucking operations (i.e., the number of adjusting operations) of this embodiment and detected values (normalized tilt angle T). The specified value (permissible value) T0 for the tilt is set to 3.0.

As shown in FIG. 3A, in trial 1, when the number of adjustments (i.e., the number of re-chucking operations) is "2", the error is set smaller than the specified value and set into the permissible range. In trial 2, the error is set within the permissible range at the time of first chucking operation and the error is kept within the permissible range at the time of succeeding chucking operations. In trial 3, the error is set within the permissible range at the time of first chucking operation. In the third trial, the error is increased to the specified value at the time of fourth chucking operation, but since the chucking position obtained at the time that the error is corrected and set into the permissible range is established in the system of this embodiment, no problem occurs even if variations occur as in trial 3.

FIG. 3B is a diagram showing the frequency distribution, (i.e., histogram) which illustrates the result of measurements obtained by measuring the tilt value T at each chucking adjustment by 40 times. In FIG. 3B, the abscissa indicates a normalized tilt angle and the ordinate indicates the frequency of occurrence of each normalized tilt angle. As is seen from FIG. 3B, two errors (including the case of 3,0) are present in the 40 measurements with respect to the specified tilt value of 3.0. Based on this fact, it can be estimated that the tilt error occurs at the rate of 5% by the chucking operation. In other words, it can be estimated that the tilt error can be reduced at the rate of 95% by effecting the chucking operation when the tilt error has occurred.

Second Embodiment

Figure 4:
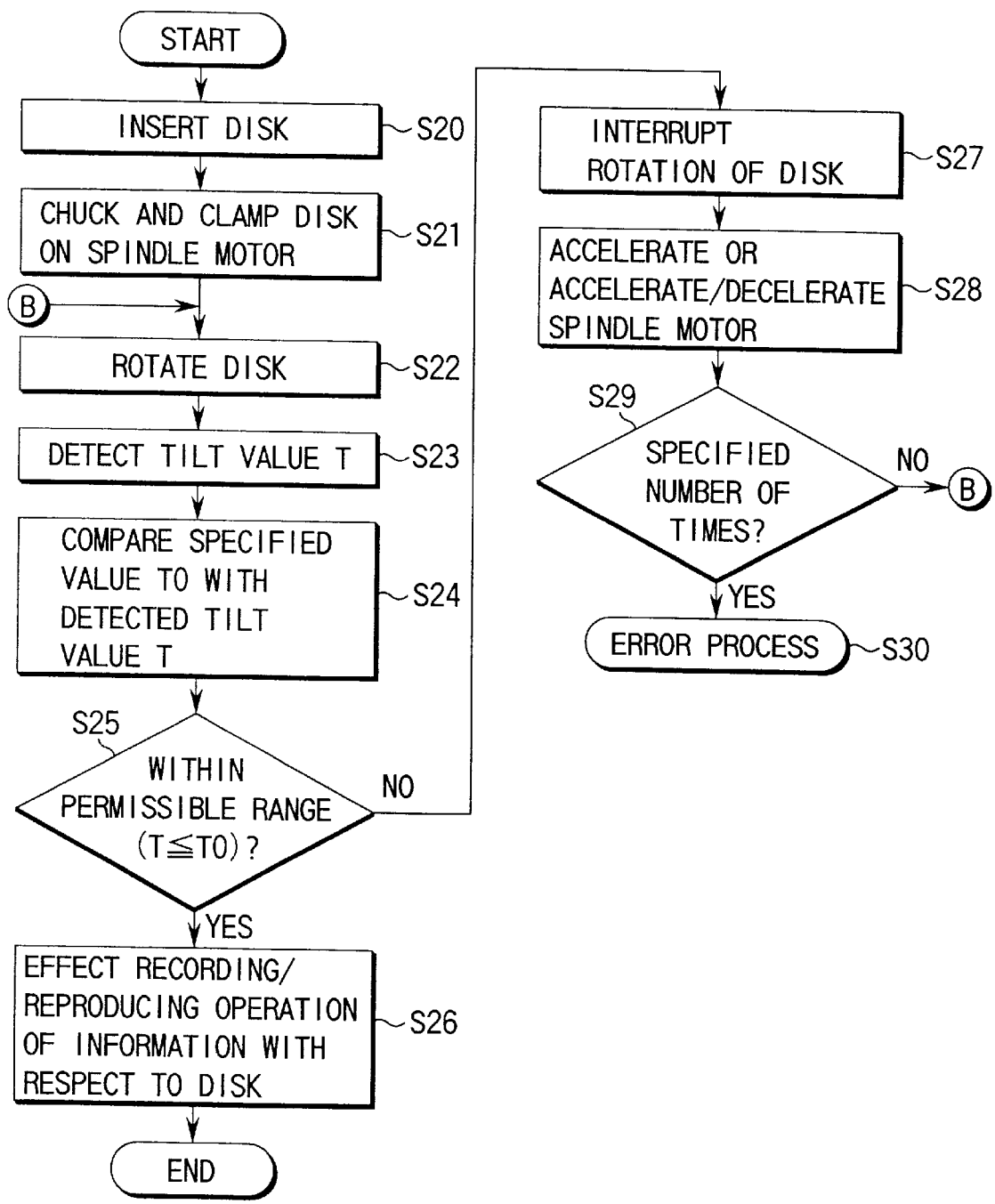
FIG. 4 is a flowchart for illustrating the operation of a second embodiment.

The second embodiment relates to the operation for controlling correction of the tilt angle of the optical disk 1 by accelerating/decelerating the rotation speed of the spindle motor 7. The second embodiment is explained below with reference to FIG. 4.

First, if the optical disk 1 is placed on the disk tray 2 and inserted into the device, the optical disk 1 is held between the clamper 4 and the spindle motor 7 and chucked on the turn table of the spindle motor 7 as described before (steps S20, S21). Then, when the optical disk 1 is rotated, the tilt detector 14*a* of the system controller 14 detects the tilt angle of the optical disk 1 which is rotated by the spindle motor 7 and performs the determining process by use of the specified value (permissible value) T0 (steps S22 to S24).

In the second embodiment, 12 the detected tilt value T lies outside the permissible range (T>T0), the following tilt adjustment process is executed. First, the rotating operation of the spindle motor 7 is interrupted to interrupt rotation of the optical disk 1 (step S27). After this, the system controller 14 controls the spindle motor 7 again to accelerate the rotation speed of the spindle motor 7 or repeatedly and alternately accelerate and decelerate the rotation speed of the spindle motor (step S28). Then, it performs the tilt detection process and determining process again.

In this case, if the detected tilt value T lies outside the permissible range, the tilt adjusting process is executed again. In a case where the detected tilt value T lies outside the permissible range even if the tilt adjusting process is repeatedly executed by the specified number of times, the system controller 14 determines that the tilt angle cannot be compensated for and effects a preset error process (steps S29, S30).

Unlike the first embodiment, according to the above construction, the inclination of the optical disk can be corrected without releasing the optical disk 1 from the disk rotating mechanism. That is, the optical disk 1 can be slid onto the turn table of the spindle motor 7 by accelerating or accelerating/decelerating the rotation speed of the spindle motor 7 in the chucking state, and as a result, the coupling state (chucking position) of the optical disk 1 with the spindle motor 7 can be changed.

Thus, like the first embodiment, the inclination of the optical disk 1 can be corrected and the tilt angle can be corrected and set into the permissible range.

Third Embodiment

In the first and second embodiments, it is considered that the tilt angle will not be corrected and set into the permissible range in some cases even if the tilt adjusting process is performed more than the specified number of times j. The third embodiment relates to a specific example of the error process performed at this time. The third embodiment is explained below with reference to FIGS. 5 and 6.

The system controller 14 compares the detected tilt value T with the specified value T0 and executes the tilt adjusting process (steps S37 to S39) if the detected tilt value T lies outside the permissible range. The process (steps S31 to S36) executed before the above process is the same as that in the case of the first and second embodiments and the explanation therefor is omitted here.

As described above, the system controller 14 repeatedly performs the tilt angle adjusting process (the number of times is i) by the specified number of times j until the tilt angle is corrected and set into the permissible range (steps S35 to S40). When the tilt angle adjusting process exceeds the specified number of times j, the system controller effects the error process shown in the steps S45 to S48 in FIG. 6.

That is, the system controller 14 outputs a tilt error signal to a host system, such as a television receiver or personal computer, for example (step S45). In response to the tilt error signal, a symbol mark or message "DISK REPRODUCTION ERROR", for example, is displayed on the display unit of the personal computer or the display screen of the television receiver. Alternatively, an alarm sound is issued via a speaker to notify the user to this effect. Further, the system controller 14 interrupts the operation of the spindle motor 7, releases the optical disk 1 from the disk rotating mechanism and ejects the same from the device (steps S46 to S48).

Figure 5:
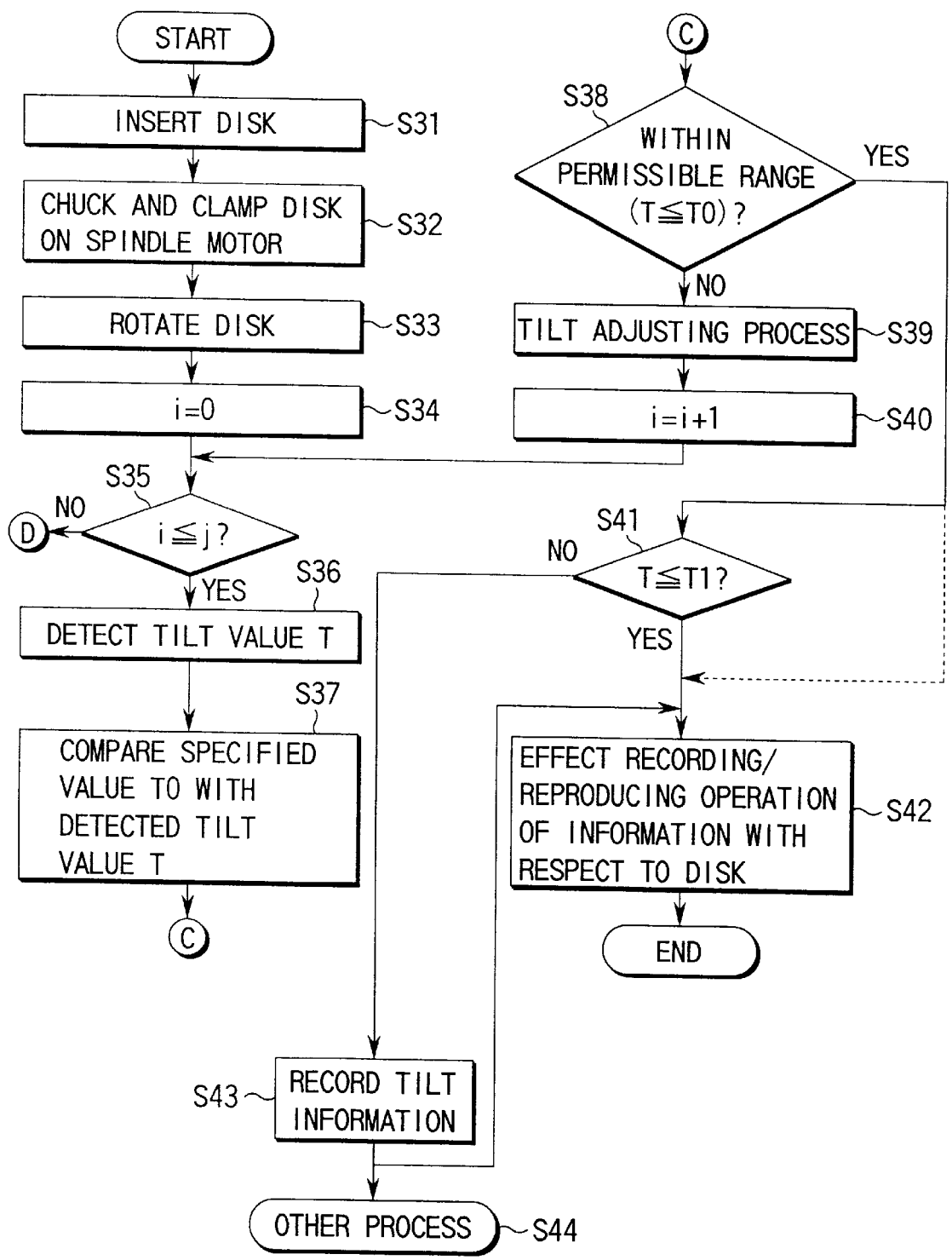
FIG. 5 is a flowchart for illustrating the operation of a third embodiment.
Figure 6:
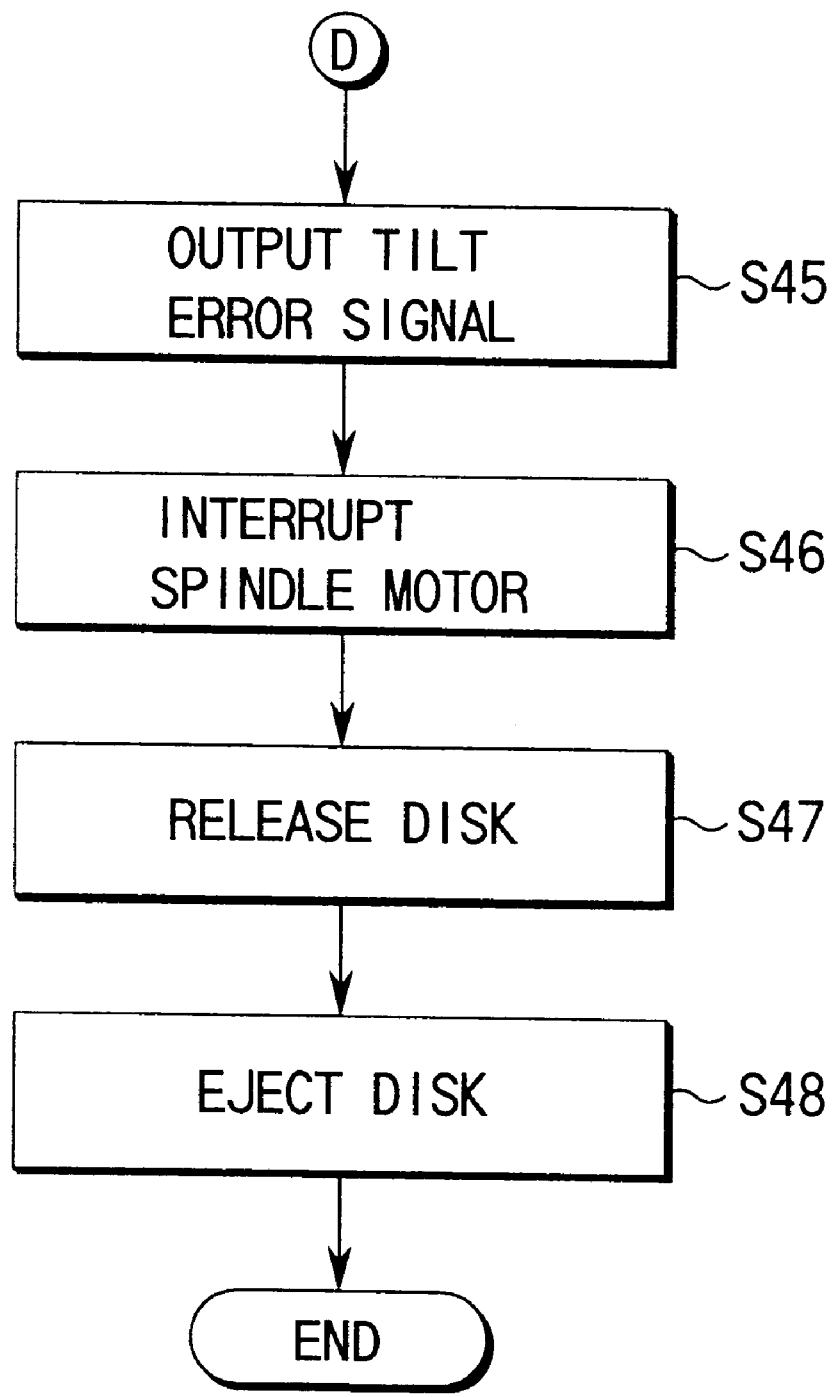
FIG. 6 is a flowchart for illustrating the operation of the third embodiment.

If it is detected in the step S38 of FIG. 5 that the detected tilt angle T is not larger than the specified value T0, the system controller 14 determines that the tilt angle lies within the permissible range and will start the normal recording/reproducing operation (step S42).

However, in this case, if the detected tilt angle T is substantially equal to the specified value T0, the probability that the reproduction error due to the tilt angle will occur becomes high. Therefore, the system controller 14 sets a reference value T1 (for example, 2.9 when T0 is 3.0) that is more restrictive than the specified value T0, and records the detected tilt value T as tilt information on a preset position of the optical disk 1. This occurs, for example, when the detected tilt angle T exceeds the reference value T1 (steps S41, S43).

The detected tilt angle is expressed by use of T(r, $\phi$). In this case, r indicates a radial position and $\phi$ is a parameter indicating a phase and physically or logically defining a position on the optical disk 1. Thus, the tilt value T is recorded on the optical disk 1 together with information of position in which it is obtained. The recorded tilt value can be used to prevent information from being recorded in the corresponding position in the recording/reproducing operation in the step S42 and used as maintenance information for the optical disk 1 or drive (step S44).

Fourth Embodiment

Next, the fourth embodiment of this invention is explained with reference to FIG. 7.

The fourth embodiment relates to a control system for detecting an eccentric amount (i.e., track error value, hereinafter referred to as a value E) of the optical disk 1 in the chucking state and effecting the track error process (i.e., track error compensating process) when the track error value E lies outside the permissible range (E0).

Figure 7:
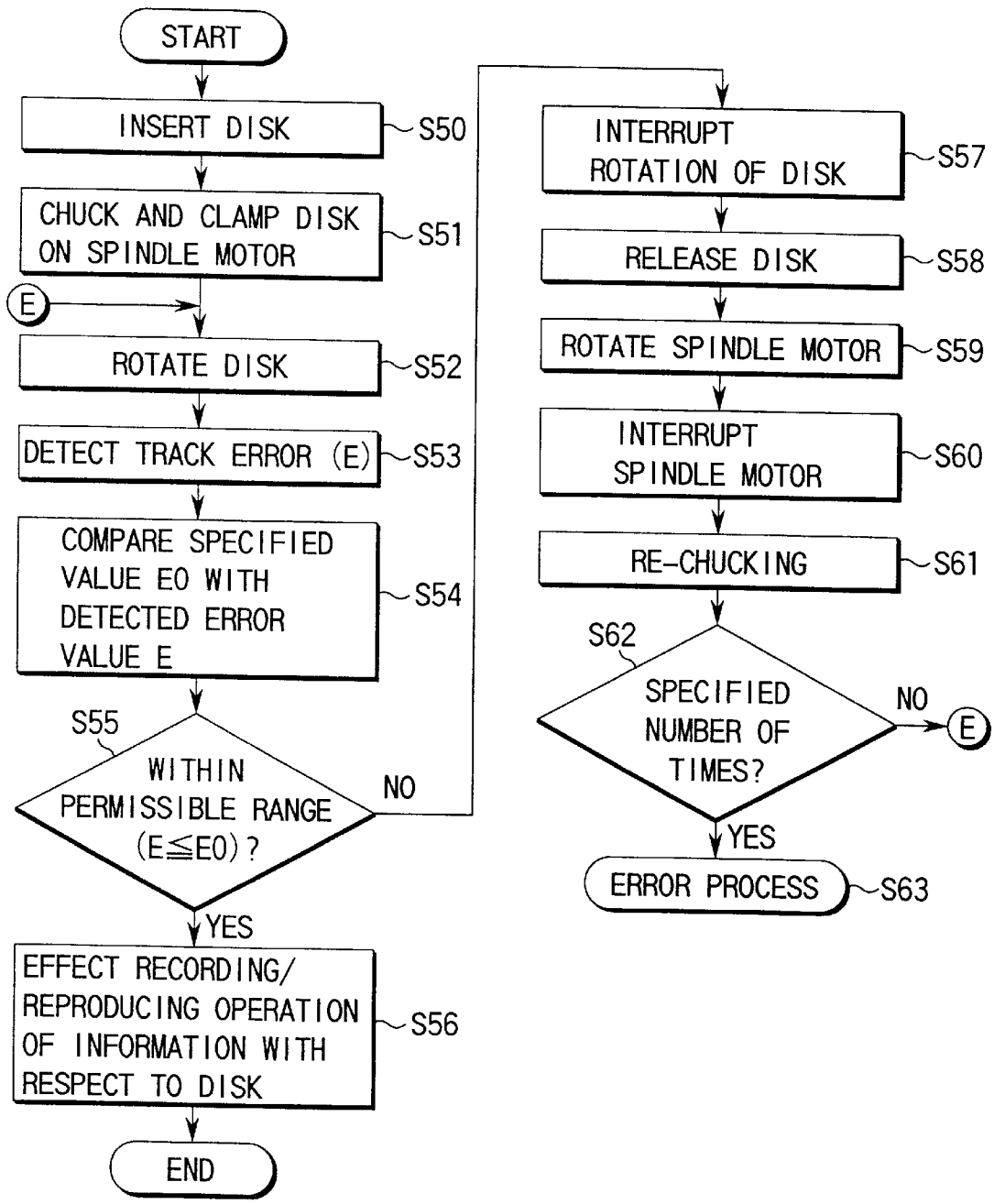
FIG. 7 is a flowchart for illustrating the operation of a fourth embodiment.

First, as shown in the steps S50 to S52 in FIG. 7, the system controller 14 chucks the optical disk 1 on the turn table of the spindle motor 7 and rotates the same. Then, in this state, it performs the track error detecting process (step S53). That is, the system controller 14 performs the determination process shown in the steps S53 to S55 and executes the following track error adjusting process (steps S57 to S62) if the detected track error value E exceeds the specified value E0 (permissible range).

First, the system controller 14 controls the spindle motor 7 to interrupt the rotation of the optical disk 1 (step S57).

Then, it un-chucks (releases) the optical disk 1 from the disk rotating mechanism and interrupts the rotation of the spindle motor 7 after rotating the spindle motor for a preset period of time. After this, the optical disk 1 is re-chucked (step S58 to S61).

In the re-chucking state, the spindle motor 7 is driven again to rotate the optical disk 1 (step S52). Then, the determination process (steps S53 to S55) for track error detection is performed once again. At this time, if the detected track error value E lies outside the permissible range, the un-chucking/chucking operation is repeatedly effected. The system controller 14 continues to perform the above operation (step S62) for a preset specified number of times until the detected track error value E is driven into the permissible range.

If the detected track error value E lies outside the permissible range even after the operation is repeatedly performed for the specified number of times, the system controller 14 determines that the track error cannot be compensated for and effects a preset error process (step S63).

With the above construction, since the chucking position of the optical disk 1 can be changed by effecting the un-chucking and chucking operations of the optical disk 1 when the detected value lies outside the permissible range, the eccentricity can be corrected. As a result, the track error at the time of recording or reproducing can be prevented.

Fifth Embodiment

Figure 8:
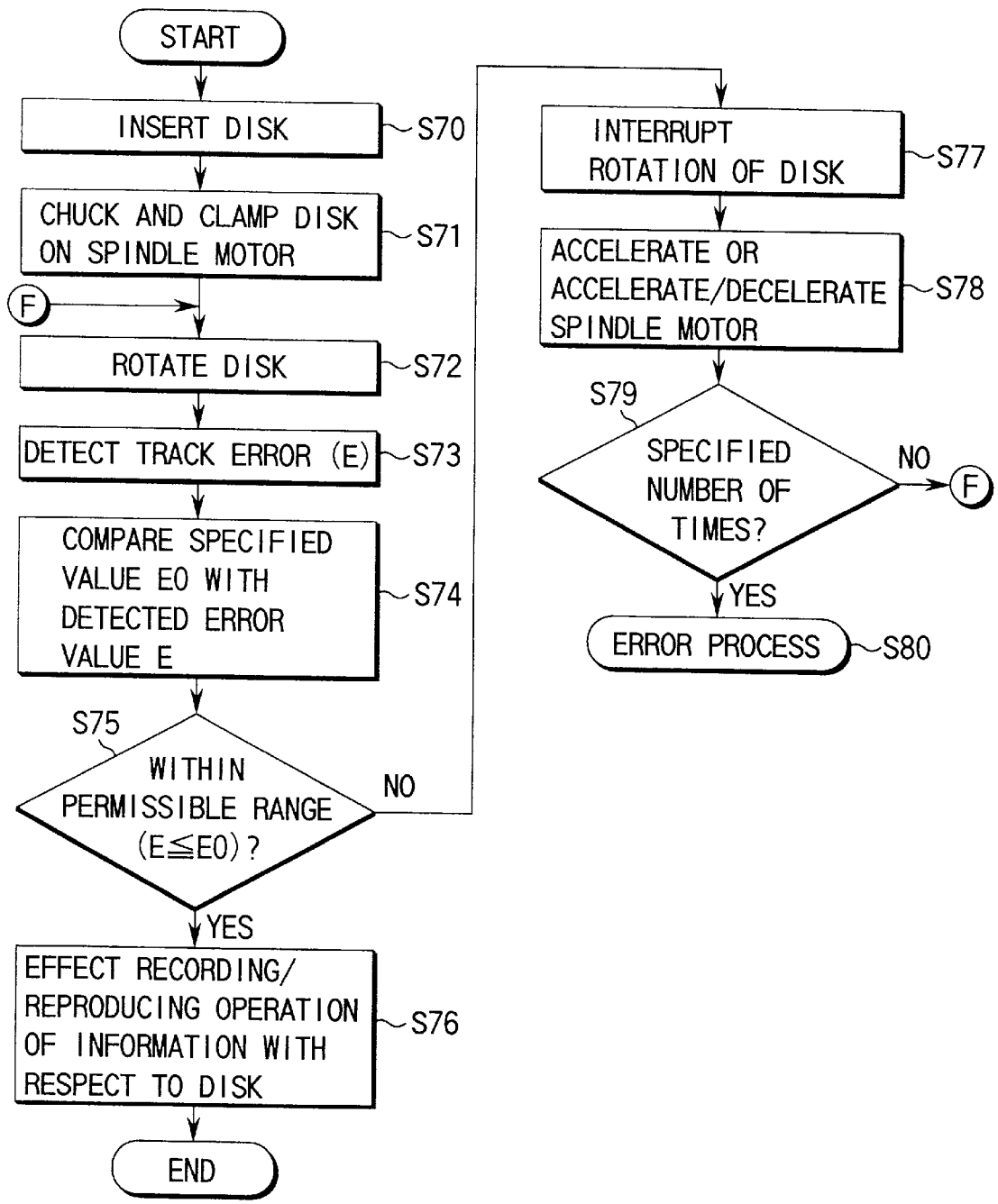
FIG. 8 is a flowchart for illustrating the operation of a fifth embodiment.

The fifth embodiment relates to a control system for correcting the track error value by accelerating/decelerating the rotation speed of the spindle motor 7 when the track error value E lies outside the permissible range. The fifth embodiment is explained with reference to FIG. 8.

First, when the optical disk 1 is placed on the disk tray 2 and received into the device in the step S70, the optical disk 1 is held between the clamper 4 and the spindle motor 7 and chucked on the turn table of the spindle motor 7 (step S71) as described before. Then, the system controller 14 detects the track error value E of the optical disk 1 which is being rotated, and performs the comparison/determination process by use of the specified value (permissible value) E0 (steps S73 to S74).

In the fifth embodiment, when the detected track error value E lies outside the permissible range (E>E0), the following track error adjusting process is executed (step S77 to S80).

First, the motor 9 is controlled to interrupt the operation of the spindle motor 7 and interrupts rotation of the optical disk 1 (step S77). After this, the system controller 14 controls the motor 9 again to accelerate the rotation speed of the spindle motor 7 or repeatedly and alternately accelerate and decelerate the rotation speed of the spindle motor (step S78). Then, it performs the track error detection process and comparison/determination process again (steps S72 to S75). In this case, if the track error value E lies outside the permissible range, the track error adjusting process is repeatedly performed.

In the case where the detected track error value E lies outside the permissible range even if the track error adjusting process is repeatedly performed for the specified number of times, the system controller 14 determines that the error value cannot be compensated for and effects a preset error process (steps S79, S80).

With the above construction, the track error value can be corrected by temporarily interrupting the spindle motor 7 without releasing (un-chucking) the optical disk 1 from the spindle motor 7 and then accelerating/decelerating the rotation speed of the spindle motor 7 with the optical disk 1 kept chucked. That is, by accelerating/decelerating the rotation speed of the spindle motor 7 at preset acceleration, a slip can be caused between the chucked optical disk 1 and the turn table of the spindle motor 7 so as to change the chucking position of the optical disk 1. Thus, the amount of eccentricity of the optical disk 1 can be corrected, and as a result, the track error value can be corrected so as to be set into the permissible range.

Sixth Embodiment

In the fourth or fifth embodiment, it is considered that the tilt angle is not corrected and set into the permissible range even when the track error adjusting process is performed for a number of times exceeding the specified number of times j. The sixth embodiment relates to a specific example of an error process effected in the above case. This embodiment is explained with reference to FIGS. 9 and 10.

The system controller 14 compares a detected track error value E with a specified value E0, and if it is determined that the detected track error value E lies outside the permissible range based on the result of comparison, it performs the track error adjusting process (steps S87 to S89). The process (steps S81 to S86) performed before the above step is the same as that in the fourth or fifth embodiment and the explanation therefor is omitted here.

As described before, the system controller 14 repeatedly performs the track error adjusting process (the number of times thereof is i) by the specified number of times j until the track error value is corrected and set into the permissible range (steps S85 to S90). When the track error adjusting process (e.g., i times) exceeds the specified number of times j, it effects the error process shown in the steps S95 to S98 in FIG. 10.

That is, the system controller 14 outputs a track error signal to a host system such as a television receiver or personal computer, for example (step S95). In response to the track error signal, a symbol mark or message "DISK REPRODUCTION ERROR", for example, is displayed on the display unit of the personal computer or the display screen of the television receiver. Alternatively, an alarm sound is issued via a speaker or an LED is lit to notify the user to this effect. Further, the system controller 14 interrupts the operation of the spindle motor 7, releases the optical disk 1 from the disk rotating mechanism and ejects the same from the device (steps S96 to S98).

Figure 9:
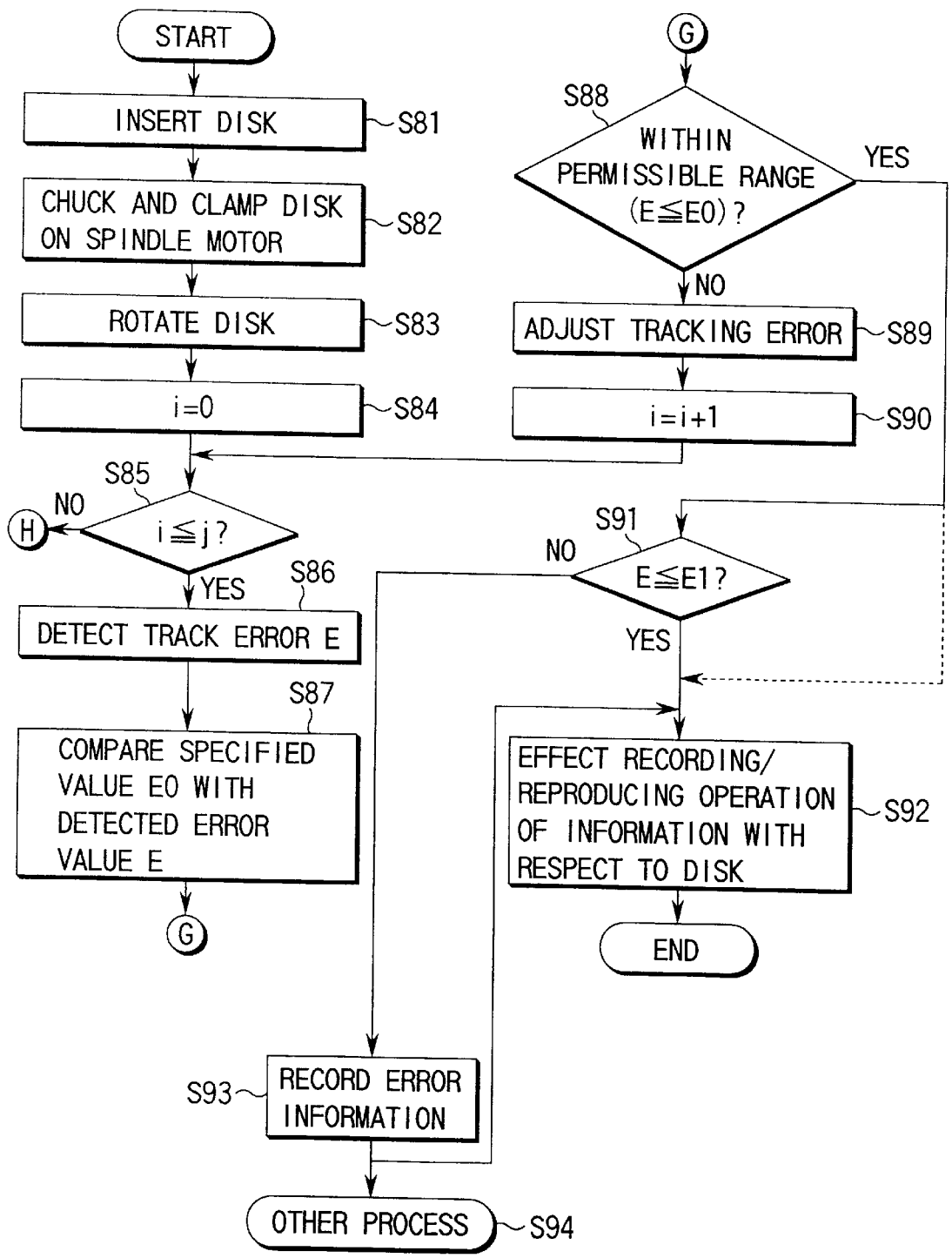
FIG. 9 is a flowchart for illustrating the operation of a sixth embodiment.
Figure 10:
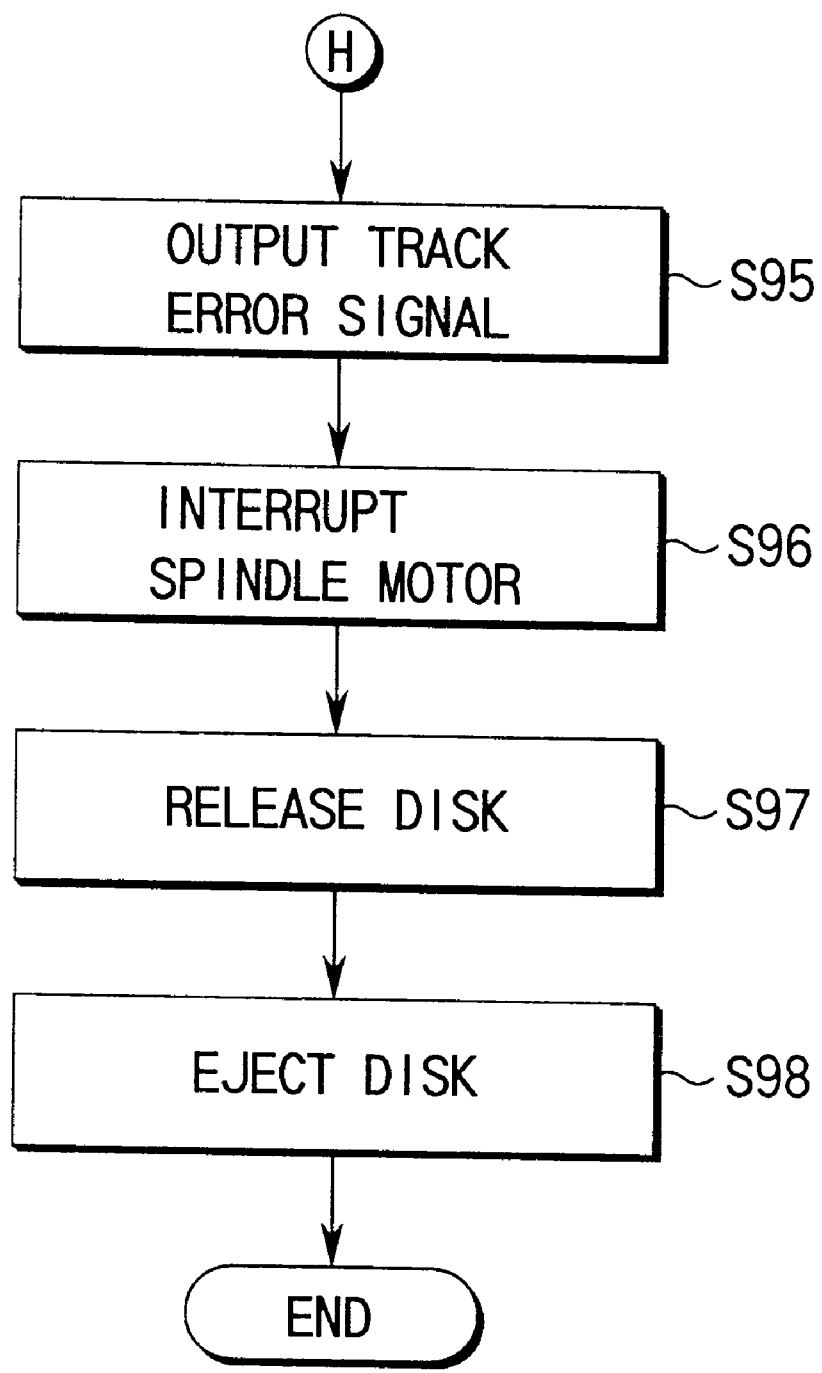
FIG. 10 is a flowchart for illustrating the operation of the sixth embodiment.

In the step S88 of FIG. 9, if the detected track error value E is not larger than the specified value E0, the system controller 14 determines that the track error value lies within the permissible range and will start the normal recording/reproducing operation (step S92).

However, in this case, if the detected track error value E is substantially equal to the specified value E0, the probability that the reproduction error due to the track error will occur becomes high. Therefore, the system controller 14 sets a reference value E1 which is more restrictive than the specified value E0, and records the detected track error value E as track error information on a preset position of the optical disk 1. this occurs, for example, when the detected track error value E exceeds the reference value E1 (steps S91, S93).

The detected track error value is expressed by use of E(r, φ). In this case, r indicates a radial position and φ is a parameter indicating a phase and physically or logically defining a position on the optical disk 1. Thus, the track error value E is recorded on the optical disk 1 together with information of position in which it is obtained. The recorded track error value can be used to prevent information from being recorded in the corresponding position and used as maintenance information for the optical disk 1 or drive (step S94).

Seventh Embodiment

The seventh embodiment relates to a control system for effecting both of the tilt detecting process and track error detecting process and effecting the tilt adjusting process and track error adjusting process explained in the first to sixth embodiments based on the result of the above detecting processes. In the seventh embodiment, as the tilt adjusting process and track error adjusting process, the operation of un-chucking and chucking the optical disk 1 is performed. The seventh embodiment is explained below with reference to FIGS. 11 and 12.

Figure 11:
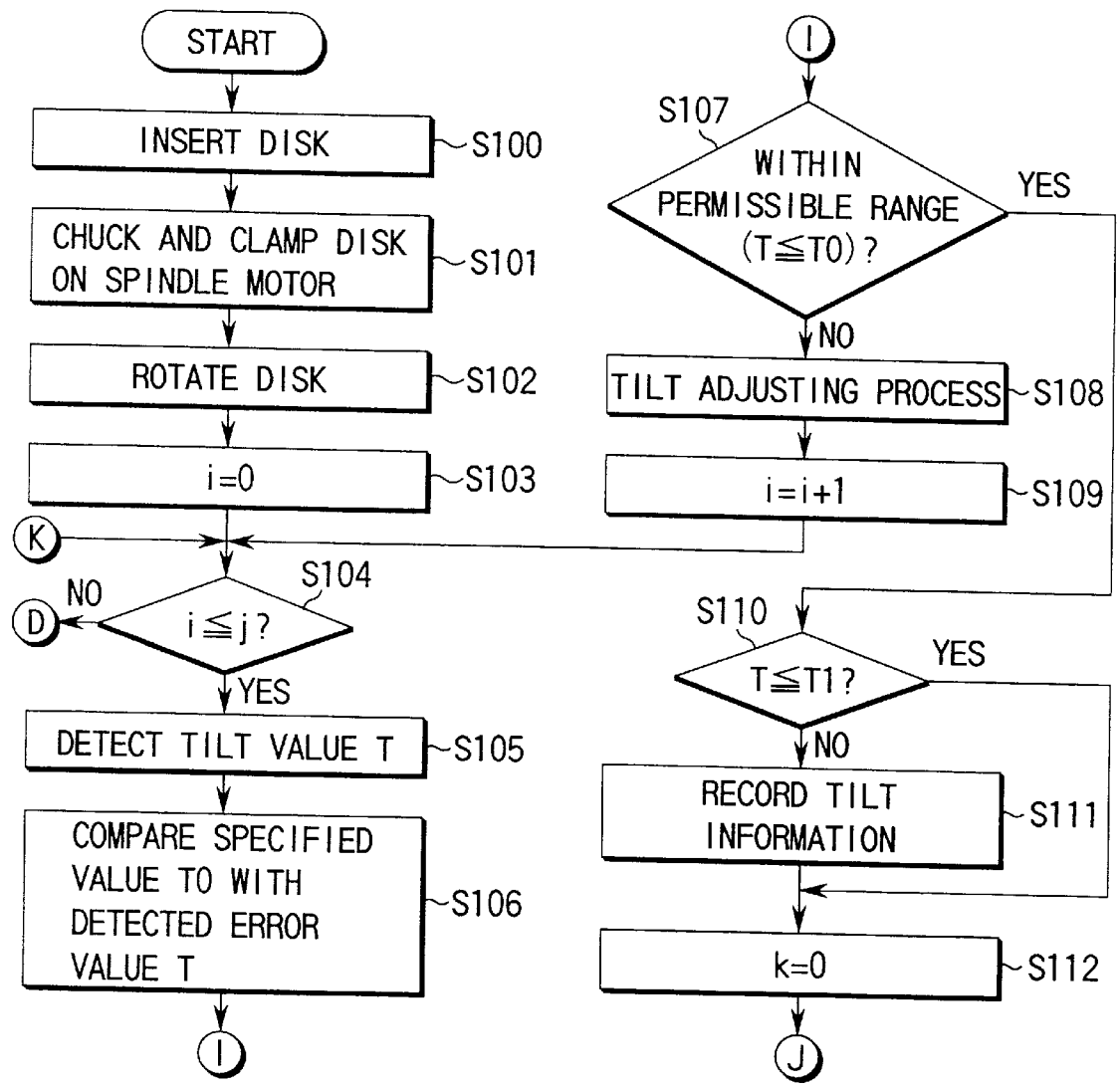
FIG. 11 is a flowchart for illustrating the operation of a seventh embodiment.

First, as shown in FIG. 11, the system controller 14 detects the tilt angle while the optical disk 1 is chucked on the disk rotating mechanism and rotated and effects the comparison/determination process by use of a specified value (steps S100 to S106). The system controller 14 repeatedly performs the tilt adjusting process (in this example, the chucking adjusting process) by a specified number of times j (steps S107 to S104) until the tilt angle is corrected and set into the permissible range. When the number of times i by which the tilt adjusting process is effected exceeds the specified number of times j, the system controller 14 effects the error process shown in the steps S45 to S48 in FIG. 6.

In this embodiment, the system controller 14 effects the determination process based on the reference value T1 which is set stricterthan the specified value T0 (step S110) as described before when the detected tilt value T is corrected and set into the permissible range by, performing the tilt adjusting process less than the specified number of times j. The system controller 14 records the detected tilt value T as tilt information in a preset position on the optical disk 1 when the detected tilt value T exceeds the reference value T1 and proforms the next track error detecting process, irrespective of the result of comparison (steps S110 to S112).

Figure 12:
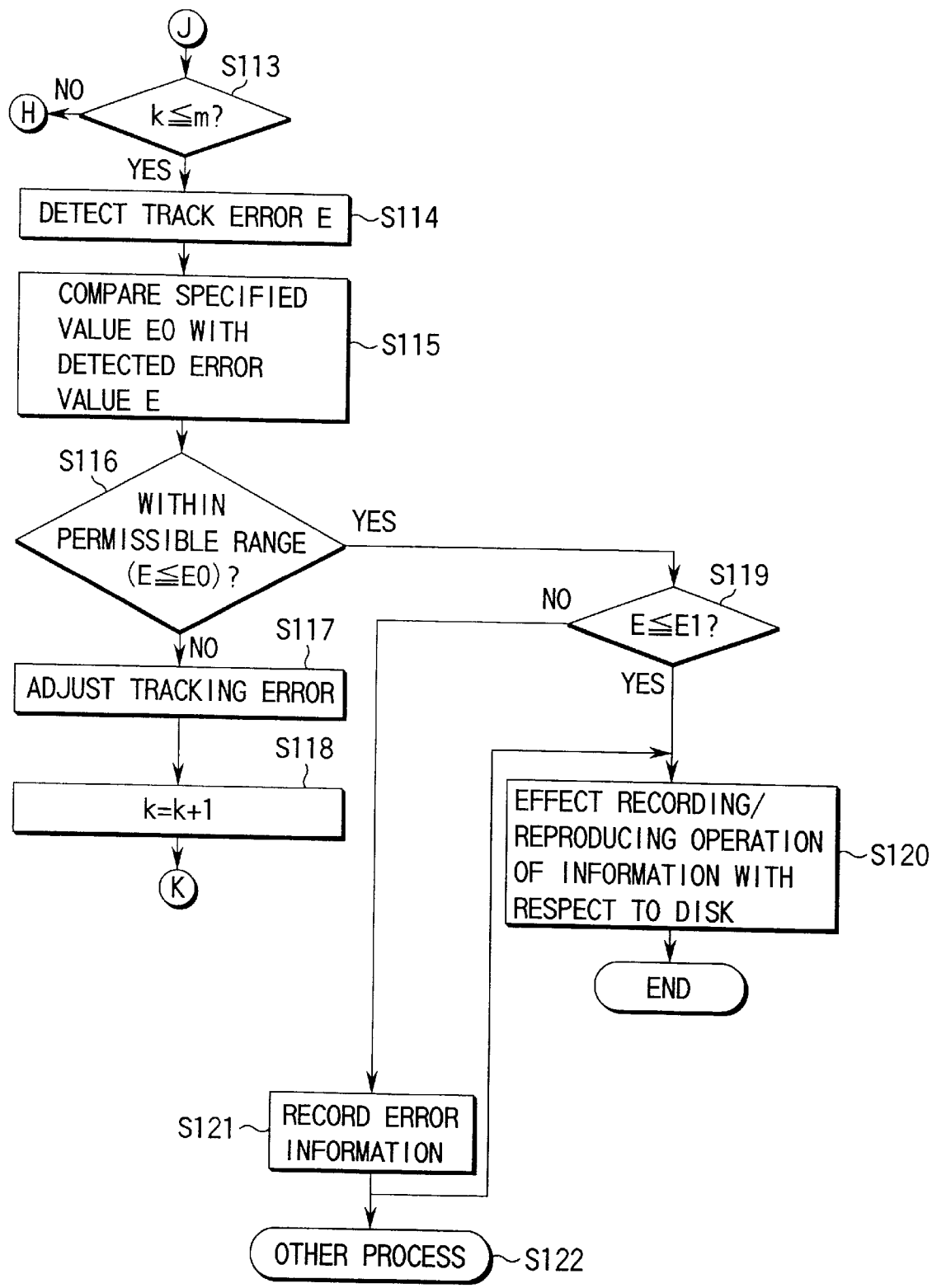
FIG. 12 is a flowchart for illustrating the operation of the seventh embodiment.

Next, as shown in FIG. 12, the system controller 14 determines whether the detected track error value E is set within the permissible range or not (steps S113 to S116) by comparing the detected track error value E with the specified value E0. The system controller 14 repeatedly performs the track error adjusting process (in this example, the chucking adjusting process) by a specified number of times m (steps S113 to S118) until the track error value is corrected and set into the permissible range. When the number of times k by which the track error adjusting process is effected exceeds the specified number of times m, the system controller 14 effects the error process shown in the steps S95 to S98 in FIG. 10.

In this case, the system controller 14 effects the determination process based on the reference value E1 which is set stricter than the specified value E0 (step S119), as described before when the detected track error value E is corrected and set into the permissible range by effecting the adjusting process less than the specified number of times m. The system controller 14 records the detected track error value E as track error information in a preset position on the optical disk 1 when the detected track error value E exceeds the reference value E1. Then, it effects the recording/reproducing operation shown in the step S120.

Tilt information (position information) and track error information (position information) recorded on the optical disk 1 are used to prevent information from being recorded in the corresponding position during the recording/reproducing operation shown in the step S120. Further, they are used as maintenance information for the optical disk 1 or drive (S122), for example.

Further, in this embodiment, the specified number of times j of the tilt angle adjustment and the specified number of times m of the track error adjustment may be independently set or defined by the total number of times of the adjusting process.

Further, in this embodiment, the re-chucking operations for the tilt angle adjustment and the track error adjustment are simultaneously effected but they may be effected separately.

Eighth Embodiment

In the first to seventh embodiments, the tilt angle detecting operation and the track error detecting operation are executed by continuously sampling the tilt angle and track error along the entire periphery of the optical disk, but a method for discontinuously sampling them from tracks, sectors or logical addresses previously set on the optical disk 1 may be used. That is, this embodiment relates a system for detecting the tilt angle and track error in the fixed phases discretely set on the optical disk 1.

A problem caused by occurrence of the tilt angle is associated with relatively low frequency components of the order of 0, 1, 2, 3 of the disk rotation in most cases. Therefore, the state of the tilt can be represented by use of only approx. 10 samplings for each rotation of the optical disk and it is not necessary to continuously calculate the tilt angle. This embodiment is made by taking this observation into consideration.

However, since the influence becomes large when the tilt angle of error is small, it is preferable to use an average value or the worst value in a plurality of measurements taken for one point on the disk as the detected amount.

Further, detection of the tilt angle may be achieved by using a system for sampling the tilt angle in synchronism with a rotation synchronizing signal which includes six pulses generated at substantially equal intervals in each revolution. This may be achieved, for example, by using a counter-electromotive force waveform created in synchronism with rotation of the spindle motor 7. Further, since the tilt angle depends on the radial position of the disk, the sampling operation may be performed only on the peripheral portion in which influence due to the disk distortion are large or errors may be determined based on sampling data on a plurality of radii. It is also possible to use a system for sampling data at an equal interval of "T/6 (sec)" based on the rotation speed of the spindle motor 7 when the rotation period is T (sec), for example.

Ninth Embodiment

The ninth embodiment is a system for outputting a tilt error signal when the number of times i of the tilt adjusting process exceeds the specified number of times j in the error process by the tilt adjusting process and recording tilt error information in an area which is three times larger than a normal track and provided in the innermost peripheral portion of the optical disk 1.

Even when the tilt angle is larger than the specified value and information cannot be recorded on or reproduced from normal tracks, it can be that it is limited to a partial area on the outer peripheral portion of the disk or the tilt angle is large in a certain angular region but is smaller than the specified value in the other regions.

Further, for example, the recording/reproducing operation can be performed in some cases by making the track width large in a partial area, such as an inner peripheral portion, if warping of the optical disk is suppressed within a certain range. Therefore, the history information of the tilt angle and the frequency of generation of tilt errors can be stored by setting a special storage area in the innermost peripheral portion of the optical disk 1, for example.

It is also possible to record the history information on the normal track by using the tilt servo process at the same time.

Tenth Embodiment

The tenth embodiment relates to a device for correcting the tilt angle by effecting the un-chucking/chucking operation in the above embodiments and relates to a control system for effecting the re-chucking operation after the un-chucking operation is performed in the device and then the spindle motor 7 is rotated by a preset phase.

Figure 13:
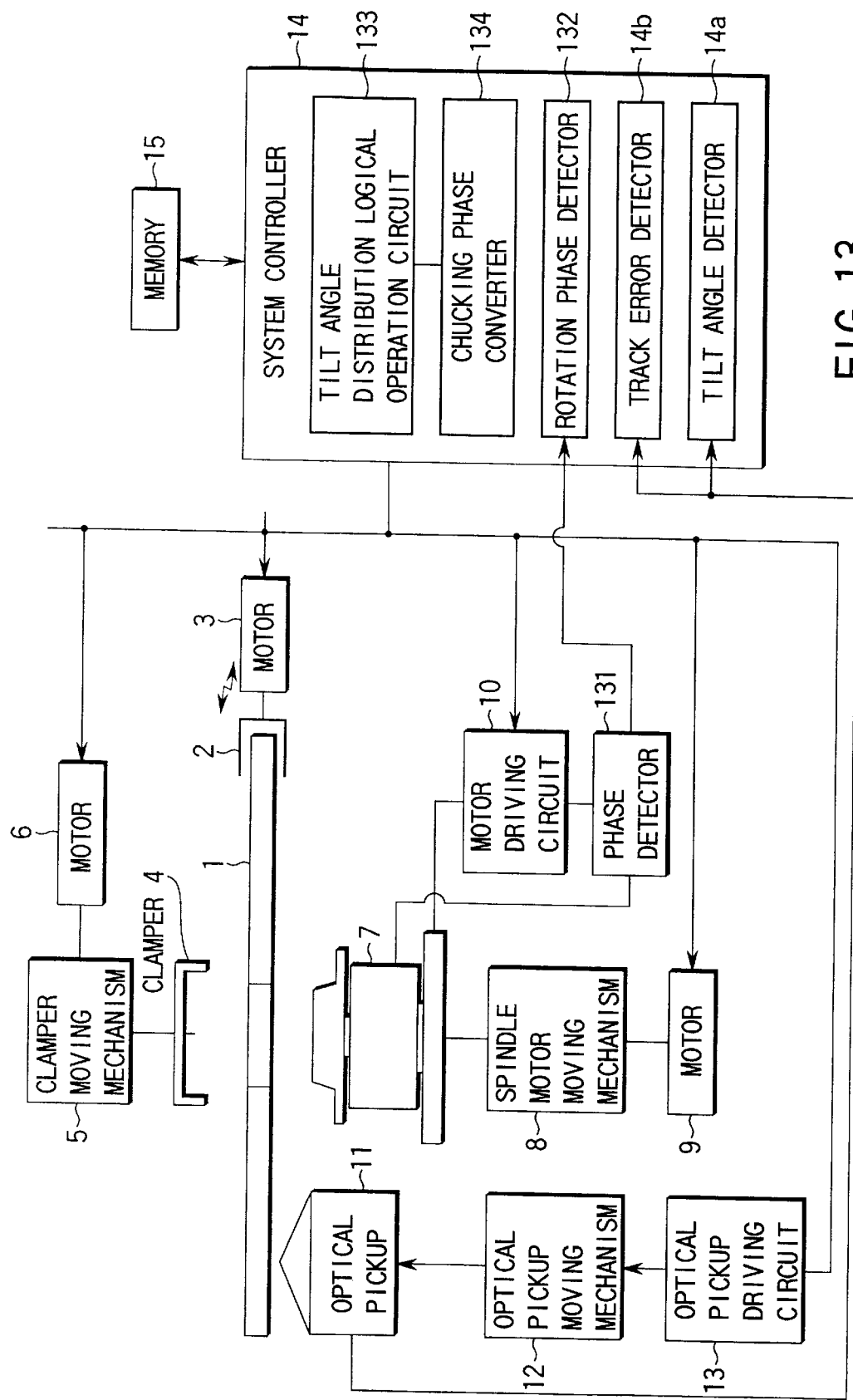
FIG. 13 is a schematic construction diagram for illustrating the operation of a tenth embodiment.

This embodiment is explained below with reference to FIG. 13. The same portions and the operations as those in the above embodiments are denoted by the same reference numerals and the detail explanation therefor is omitted.

This embodiment uses a phase detector 131 for detecting the rotation phase of the spindle motor 7. The phase detector 131 may, for example, use a counter-electromotive force pulse creating-device or rotation pulse-creating device using an encoder plate.

A detection signal from the phase detector 131 is processed by a rotation phase detector 132 provided in the system controller 14. The result of phase detection is processed together with the tilt angle detected by the tilt angle detector 14*a* in a tilt angle distribution logical operation circuit 133 provided in the system controller 14. That is, the tilt angle distribution logical operation circuit 133 sets the rotation phase of the spindle motor 7 in a one-to-one correspondence with the tilt angle and calculates the tilt angle distribution over the entire periphery of the optical disk 1. The tilt angle distribution is stored in the memory 15 and supplied to a chucking phase calculator 134.

The chucking phase calculator 134 determines the chucking phase based on the tilt angle distribution. That is, when the tilt angle exceeds the reference value, it performs the operation of releasing (un-chucking) the optical disk 1 and then re-chucking. While the optical disk 1 is released, the spindle motor 7 is rotated to change the chucking position. The rotation phase of the spindle motor 7 is referred to as a chucking phase.

The chucking phase calculator 134 sets a position deviated by 90 or 180 degrees from the phase at which the maximum tilt angle is obtained as a chucking phase when the tilt angle is distributed in a sinusoidal waveform for each rotation period, for example.

Then, the system controller 14 controls the motor driving circuit 10 to rotate the spindle motor 7 based on the chucking phase determined by the chucking phase calculator 134. After this, the optical disk is re-chucked and the tilt angle is measured and compared.

With the above construction, since the chucking position suitable for correcting the tilt angle can be estimated, the tilt angle can be corrected by a small number of correcting processes.

The method of the eighth embodiment can be applied to the method for effecting the correcting process by accelerating/decelerating the rotation speed of the spindle motor 7 and the method for correcting the track error.

In order to perform the correcting process by accelerating/decelerating the rotation speed of the spindle motor 7, the amount of phase difference caused between the optical disk 1 and the turn table of the spindle motor 7, with respect to the acceleration applied to the spindle motor 7 and the application period of time thereof, is previously stored in the memory 15 or the like. By use of the stored data, the same process as that described above can be effected.

Further, in order to perform the method for correcting the track error, the track error is corrected based on the theory that the track error value can be generallyl corrected by correcting the deviation in the deviating direction in which the track error value is deviated by 180 degrees from the position in which the maximum value thereof is obtained.

This invention is not limited to the first to tenth embodiments and can be variously modified without departing from the technical scope thereof.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. An optical disk device which records information on or reproduces recording information from an optical disk by use of optical head while the optical disk is chucked on a disk rotating mechanism and rotated, said optical disk device comprising:

detecting means for detecting a tilt angle of the optical disk as it rotates;

determining means for determining whether the tilt angle detected by said detecting means is set within a permissible range; and control means for re-executing the chucking operation on the optical disk when said determining means determines that the tilt angle exceeds the permissible range, wherein, upon determining that the tilt angle exceeds the permissible range, said control means causes the optical disk to be released from the disk rotating mechanism, adjusts the disk rotating mechanism, and causes the optical disk to be re-chucked.

2. The optical disk device according to claim 1, wherein said control means adjusts the disk rotating mechanism by causing the disk rotating mechanism to be rotated by a preset angle based on the tilt angle after the optical disk is released from the disk rotating mechanism.

3. The optical disk device according to claim 1, wherein said control means repeatedly executes the re-chucking operation for a preset specified number of times until the tilt angle of the optical disk is set into the permissible range.

4. The optical disk device according to claim 3, further comprising error processing means for notifying an occurrence of a tilt error when the tilt angle lies outside the permissible range, even if the control means repeatedly performs the re-chucking operation for the preset specified number of times.

5. The optical disk device according to claim 1, further comprising means for recording the detected tilt angle together with information of a position in which the tilt angle is detected in order to prevent information from being recorded in the detected position.

6. An optical disk device which records information on or reproduces recording information from an optical disk by use of optical head while the optical disk is chucked on a disk rotating mechanism and rotated, said optical disk device comprising:

detecting means for detecting a tilt angle of the optical disk as it rotates;

determining means for determining whether the tilt angle detected by said detecting means is set within a permissible range; and control means for re-executing the chucking operation on the optical disk when said determining means determines that the tilt angle exceeds the permissible range, wherein said control means re-executes the chucking operation on the optical disk by changing the rotation speed of the disk rotating mechanism when said determining means determines that the tilt angle exceeds the permissible range.

7. The optical disk device according to claim 6, wherein said control means controls the change of the speed, and repeatedly performs the rotation speed change operation, until the tilt angle with respect to the optical disk chucked on the disk rotating mechanism is set into the permissible range.

8. The optical disk device according to claim 7, further comprising error processing means for notifying an occurrence of a tilt when the tilt angle lies outside the permissible range, even if the control means repeatedly performs the re-chucking operation for the preset specified number of times.

9. A method of controlling an optical disk device which records information on or reproduces recording information from an optical disk by use of optical head while the optical disk is chucked on a disk rotating mechanism and rotated, said method comprising:

detecting a tilt angle of the optical disk as it rotates;

determining whether the tilt angle detected in said detecting step is set within a permissible range;

re-executing the chucking operation on the optical disk when it is determined that the tilt angle exceeds the permissible range, said re-executing chucking operation includes causing the optical disk to be released from the disk rotating mechanism, adjusting the disk rotating mechanism, and causing the optical disk to be re-chucked; and repeatedly performing the re-chucking operation until the tilt angle of the optical disk is set into the permissible range.

10. An optical disk device which records information on or reproduces recording information from an optical disk by use of optical head while the optical disk is chucked on a disk rotating mechanism and rotated, said optical disk device comprising:

detecting means for detecting a track error value of the optical disk as it rotates;

determining means for determining whether the track error value detected by said detecting means is set within a permissible range; and control means for re-executing the chucking operation on the optical disk when said determining means determines that the track error value exceeds the permissible range, wherein, upon determining that the track error value exceeds the permissible range, said control means causes the optical disk to be released from the disk rotating mechanism, adjusts a chucking position of the optical disk, and causes the optical disk to be re-chucked.

11. The optical disk device according to claim 10, wherein said control means repeatedly executes the re-chucking operation for a preset specified number of times until the track error value of the optical disk is set into the permissible range.

12. The optical disk device according to claim 11, further comprising error processing means for notifying an occurrence of a track error when the track error value lies outside the permissible range, even if the control means repeatedly performs the re-chucking operation for the preset specified number of times.

13. The optical disk device according to claim 10, further comprising means for recording the detected track error value together with information of a position in which the track error value is detected in order to prevent information from being recorded in the detected position.

14. An optical disk device which records information on or reproduces recording information from an optical disk by use of optical head while the optical disk is chucked on a disk rotating mechanism and rotated, said optical disk device comprising:

detecting means for detecting a track error value of the optical disk as it rotates;

determining means for determining whether the track error value detected by said detecting means is set within a permissible range; and control means for re-executing the chucking operation on the optical disk when said determining means determines that the track error value exceeds the permissible range, wherein said control means re-executes the chucking operation on the optical disk by changing the rotation speed of the disk rotating mechanism when said determining means determines that the track error value exceeds the permissible range.

15. The optical disk device according to claim 14, wherein said control means controls the change of the speed, and repeatedly performs the rotation speed change operation, until the track error value with respect to the optical disk chucked on the disk rotating mechanism is set into the permissible range.

16. The optical disk device according to claim 15, further comprising error processing means for notifying an occurrence of a tilt when the track error value lies outside the permissible range, even if the control means repeatedly performs the re-chucking operation for the preset specified number of times.

17. A method of controlling an optical disk device which records information on or reproduces recording information from an optical, disk by use of optical head while the optical disk is chucked on a disk rotating mechanism and rotated, said method comprising:

detecting a track error value of the optical disk as it rotates;

determining whether the track error value detected in said detecting step is set within a permissible range;

re-executing the chucking operation on the optical disk when it is determined that the track error value exceeds the permissible range, said re-executing chucking operation includes causing the optical disk to be released from the disk rotating mechanism, adjusts a chucking position of the optical disk, and causing the optical disk to be re-chucked; and repeatedly performing the re-chucking operation until the track error value of the optical disk is set into the permissible range.

18. An optical disk device which records information on or reproduces recording information from an optical disk by use of optical head while the optical disk is chucked on a disk rotating mechanism and rotated, said optical disk device comprising:

detecting means for detecting a tilt angle of the optical disk as it rotates;

means for recording the detected tilt angle and information of a position in which the tilt angle is detected in order to prevent information from being recorded in the detected position;

determining means for determining whether the tilt angle detected by said detecting means is set within a permissible range; and control means for re-executing the chucking operation on the optical disk when said determining means determines that the tilt angle exceeds the permissible range, wherein, upon determining that the tilt angle exceeds the permissible range, said control means causes the optical disk to be released from the disk rotating mechanism, adjusts the disk rotating mechanism, and causes the optical disk to be re-chucked.

19. An optical disk device which records information on or reproduces recording information from an optical disk by use of optical head while the optical disk is chucked on a disk rotating mechanism and rotated, said optical disk device comprising:

detecting means for detecting a track error value of the optical disk as it rotates;

means for recording the detected track error value and information of a position in which the track error value is detected in order to prevent information from being recorded in the detected position;

determining means for determining whether the track error value detected by said detecting means is set within a permissible range; and control means for re-executing the chucking operation on the optical disk when said determining means determines that the track error value exceeds the permissible range, wherein, upon determining that the track error value exceeds the permissible range, said control means causes the optical disk to be released from the disk rotating mechanism, adjusts a chucking position of the optical disk, and causes the optical disk to be re-chucked.

* * * * *